Sept. 28, 1926.  
W. HEINSE, JR  
1,601,306  
MULCHING AND BLIND-PLOWING ATTACHMENT FOR PLANTERS  
Filed May 1, 1926

Inventor  
William Heinse Jr.  
By Lynn A. Latty  
Attorney

Patented Sept. 28, 1926.

1,601,306

UNITED STATES PATENT OFFICE.

WILLIAM HEINSE, JR., OF DANBURY, IOWA.

MULCHING AND BLIND-PLOWING ATTACHMENT FOR PLANTERS.

Application filed May 1, 1926. Serial No. 105,963.

My invention relates to mulching attachments for planters of the type in which the wheels are designed for covering the seed behind the planting shoes, and it is my aim to provide an attachment of simple, durable and inexpensive construction for blind plowing or throwing up a temporary ridge over a planted row to prevent washing or uncovering of the seed by winds.

More particularly, my invention relates to that type of mulching attachment including a pair of discs mounted in converging relation behind each wheel.

The principal object of my invention is to provide such an attachment in which the discs will remain constantly equi-distant from the row, regardless of side sway of the wheel frame of the planter when traveling on side hills.

Another object is to provide such an attachment which will be raised and lowered with the raising and lowering of the planter shoe.

Another object is to provide such an attachment which will not be affected by backing of the planter.

With these and other objects in view, my invention consists in the construction, arrangement and combination of the various parts of my device, whereby the objects contemplated are attained, as hereinafter more fully set forth, pointed out in my claim and illustrated in the accompanying drawings, in which:

The covering which is done by the wheels of the ordinary planter is aided very materially by the use of a pair of discs positioned in converging relation behind each wheel. The discs loosen the soil and throw it toward the row, covering the corn more thoroughly than the wheels can do. By using such a pair of discs, the rows of seed can be "blind plowed" or covered with a deep ridge of earth, which prevents washing away of the seed, especially on side hills. Such blind plowing will also prevent exposure of the seed from windstorms.

In blind plowing the ridges are ordinarily harrowed down after the second week following seeding in order to allow the sprouting corn to leave the ground, but it has been found very advantageous to cover the rows with a very deep ridge during the first two weeks after planting.

I am aware that it is not new to use a pair of discs so disposed for this purpose. Heretofore such discs have been attached to the wheel frame of the planter, and it has been found that there are two objections to such an arrangement. First, the wheel frame is flexible and allows the wheels to travel down hill out of alignment with the planter shoes when traveling on a side hill, thus throwing both wheels and mulching attachment away from proper relation with the row, and second, the attachment is of such nature that while backing the planter, the disc brackets are very likely to be bent or broken.

The blind plowing discs cut to such a depth in order to produce the proper ridge that when the discs are thrown out of alignment they will dig up a row of seeded corn and scatter it. It is therefore of considerable importance that the discs be kept at their proper distance from the row.

I have found that by attaching the disc brackets directly to the planter shoe, and extending them rearwardly in substantially horizontal positions around the wheel, that both of these objections are eliminated.

Furthermore, by attaching the disc brackets rigidly to the planter shoe the blind plowing discs will be raised from the ground when the planter shoe is raised, and will be operative when the planter shoe is in the ground.

Figure 1:
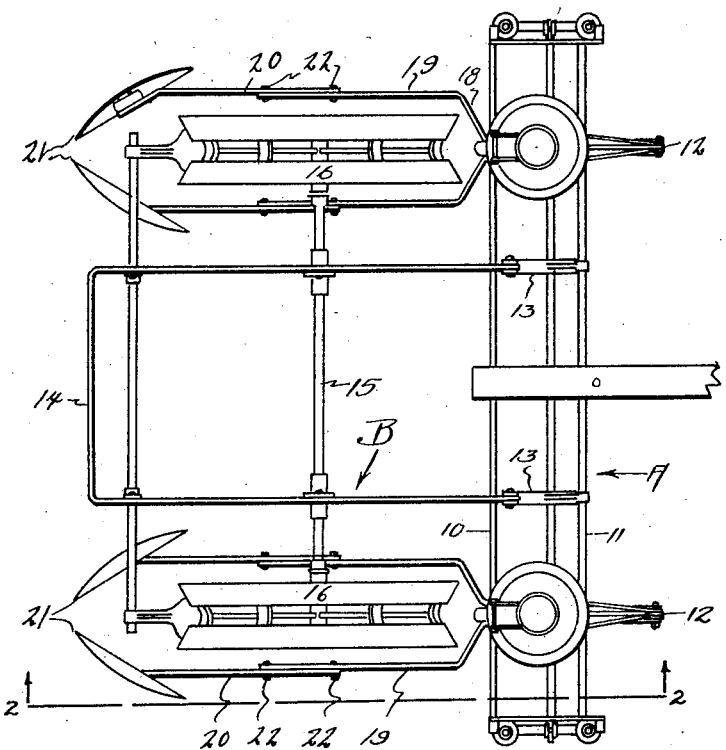
Fig. 1 is a plan view of a planter, parts of which are omitted, with my attachment thereon.
Figure 2:
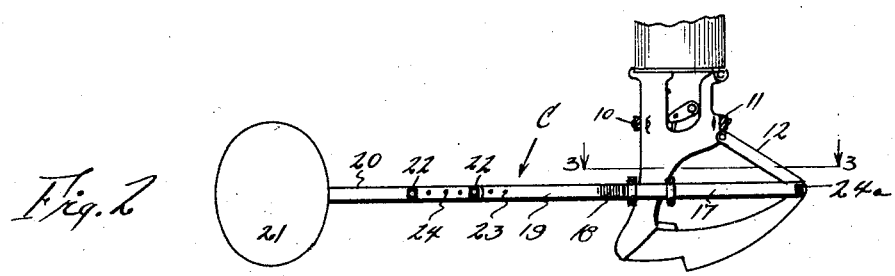
Fig. 2 is a longitudinal sectional view, taken on the line 2—2 of Fig. 1.
Figure 3:
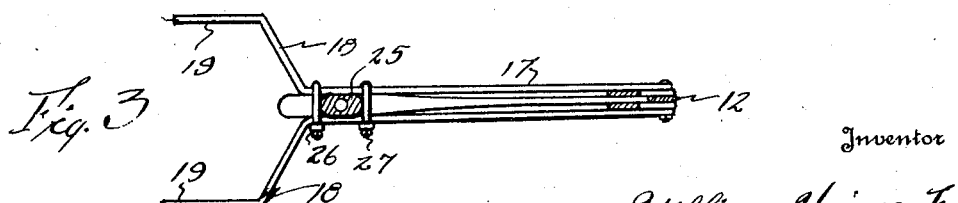
Fig. 3 is a detail sectional view, taken on the line 3—3 of Fig. 2.

In Fig. 1 I have shown a planter having a forward frame, A, and a wheel frame, B. The forward frame comprises the two spaced transverse bars, 10 and 11, connected by the shoes, 12, and intermediate their ends by the brackets, 13. The wheel frame comprises a U-shaped member, 14, the ends of which are swingingly connected to the brackets, 13. The axle, 15, secured to the frame, 14, carries the covering wheels, 16.

The shoes, 12, which cut the ground, keep the frame, A, in proper position, even on a side hill, but the wheel frame, B, will lean downhill when the planter is thus traveling. This causes the wheels to lose their alignment with the planted rows, and improper covering will result.

Blind plowing discs carried by the wheel frame will also be thrown out of alignment with the planted rows.

My attachment comprises the bracket arms, C, each of which have the forward portions, 17, the offset portions, 18, and the rear portions, 19. These latter are preferably formed in two sections, the rear sections, 20, carrying the discs, 21, and being adjustably secured to the portions, 19, by means of bolts, 22, extended through any of a series of openings, 23 and 24, in the parts, 19 and 20, respectively. The object in providing adjustment of the bracket arms is to make the attachment adaptable to planters of different lengths in which the wheels are different distances from the planter shoes.

The portions, 17, are secured to the nose of the planter shoe by means of a bolt, 24$^a$, which normally forms part of the shoe, and are secured to the rear leg, 25, of the shoe by means of U-bolts, 26 and 27, extended around the arms, C, on either side of the leg, 25. A clamping engagement is thus secured. An advantage of this arrangement is the ease with which the brackets, C, may be adjusted. By loosening one of the U-bolts, 26 or 27, slightly, the brackets may be swung upwardly or downwardly, pivoting about the bolt, 24$^a$.

It would seem that the engagement of the brackets, as described, would not be sufficient to resist the pressure to which the discs are subjected, especially in backing, and yet I find that in practice the brackets are never thrown out of position by any ordinary movement of the planter.

On the other hand, should one of the discs hit an unyielding obstruction which would otherwise bend its bracket arm, the frictional engagement with the leg, 25, will allow the brackets to slip upwardly before such bending takes place.

When the planter is traveling on a side hill, the wheels may slide sideways without altering the arrangement of the discs. They will follow the row and remain exactly equidistant therefrom.

I attribute the action of the attachment in backing, partly to the fact that the arms C, are horizontal so as to receive the thrust in a parallel direction, and partly to their resiliency, which will allow the discs to vibrate laterally in response to the pressure of the earth against the inclined sides of the discs.

The arms attain their resiliency by their extreme length, extending entirely around the wheels.

Some changes may be made in the construction and arrangement of the parts of my invention without departing from the real spirit and purpose of my invention, and it is my intention to cover by my claim, any modified forms of structure or use of mechanical equivalents which may be reasonably included within their scope.

I claim as my invention:

A mulching attachment for a planter having a forward frame and a wheel frame flexibly attached thereto and carrying a wheel, said forward frame including a shoe having a nose and a leg, comprising a pair of bracket arms secured to the nose and having a frictional engagement with the leg, a pair of bolts connecting the arms on either side of the leg to produce said frictional engagement, said arms being bent outwardly rearwardly of the leg and thence extended rearwardly in substantially horizontal position, spaced from either side of the wheel, and discs carried by the rear ends of said arms in converging positions rearwardly of the wheel.

Signed at Sioux City, in the county of Woodbury and State of Iowa, this 27th day of April, 1926.

WILLIAM HEINSE, Jr.